(12) United States Patent
Madduri et al.

(10) Patent No.: US 10,671,482 B2
(45) Date of Patent: Jun. 2, 2020

(54) PROVIDING CONSISTENCY IN A DISTRIBUTED DATA STORE

(71) Applicant: Cohesity, Inc., Santa Clara, CA (US)

(72) Inventors: Sashikanth Madduri, Mountain View, CA (US); Sachin Jain, Fremont, CA (US); Jeevitha Kirubanandam, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 83 days.

(21) Appl. No.: 15/702,527

(22) Filed: Sep. 12, 2017

(65) Prior Publication Data

US 2019/0079831 A1 Mar. 14, 2019

(51) Int. Cl.
| | |
|---|---|
| *G06F 11/00* | (2006.01) |
| *G06F 11/14* | (2006.01) |
| *G06F 16/27* | (2019.01) |
| *G06F 11/20* | (2006.01) |

(52) U.S. Cl.
CPC ........ *G06F 11/1448* (2013.01); *G06F 16/273* (2019.01); *G06F 11/2094* (2013.01); *G06F 2201/805* (2013.01); *G06F 2201/82* (2013.01)

(58) Field of Classification Search
CPC .. G06F 16/27; G06F 16/2365; G06F 11/1446; G06F 11/1471; G06F 11/1662; G06F 2201/82; H04L 69/40
See application file for complete search history.

(56) References Cited

U.S. PATENT DOCUMENTS

| | | | | |
|---|---|---|---|---|
| 5,553,279 | A * | 9/1996 | Goldring | G06F 11/1471 707/615 |
| 7,058,957 | B1 * | 6/2006 | Nguyen | G06F 9/542 709/223 |
| 7,120,821 | B1 | 10/2006 | Skinner | |
| 7,421,578 | B1 * | 9/2008 | Huang | H04L 63/065 370/254 |
| 7,778,984 | B2 * | 8/2010 | Zhang | G06F 11/1662 707/696 |
| 8,060,619 | B1 * | 11/2011 | Saulpaugh | H04L 67/1078 709/227 |
| 8,352,424 | B2 * | 1/2013 | Zunger | H04L 67/1095 707/610 |
| 8,433,760 | B2 * | 4/2013 | Ganapathy | H04L 43/10 370/216 |
| 8,583,958 | B2 * | 11/2013 | Surkov | H04L 67/1051 714/4.1 |
| 8,984,119 | B2 * | 3/2015 | Jennings | G06F 9/542 709/206 |
| 9,525,725 | B1 * | 12/2016 | Bute | H01L 21/28088 |
| 9,602,614 | B1 * | 3/2017 | Shankaran | G06F 15/177 |
| 9,697,227 | B2 * | 7/2017 | Aron | G06F 16/1767 |
| 9,983,823 | B1 * | 5/2018 | Mritunjai | G06F 3/0644 |

(Continued)

*Primary Examiner* — Loan L. T. Truong
(74) *Attorney, Agent, or Firm* — Van Pelt, Yi & James LLP

(57) ABSTRACT

A request to store a new value to a data entity to be fault tolerant across a plurality of nodes is received. The data entity being in an intermediate state is indicating to at least one less than a majority of the plurality of nodes. A request to read a stored value of the data entity is received. A latest value instance of the data entity among a majority nodes of the plurality of nodes is determined. A value of the latest value instance in a majority nodes of the plurality of nodes is stored as a next value instance of the data entity.

20 Claims, 9 Drawing Sheets

(56) References Cited

U.S. PATENT DOCUMENTS

| | | | |
|---|---|---|---|
| 10,216,770 B1* | 2/2019 | Kulesza | G06F 16/182 |
| 10,496,664 B2* | 12/2019 | Kaplan | G06F 16/248 |
| 2001/0056461 A1* | 12/2001 | Kampe | H04L 41/0618 |
| | | | 709/201 |
| 2002/0042693 A1* | 4/2002 | Kampe | H04L 41/0618 |
| | | | 702/186 |
| 2004/0205377 A1 | 10/2004 | Nakamura | |
| 2005/0132154 A1* | 6/2005 | Rao | H04L 67/1097 |
| | | | 711/162 |
| 2005/0198359 A1* | 9/2005 | Basani | H04L 67/1095 |
| | | | 709/232 |
| 2008/0071853 A1* | 3/2008 | Mosier | H04L 67/1095 |
| | | | 709/201 |
| 2008/0071878 A1* | 3/2008 | Reuter | H04L 67/1031 |
| | | | 709/208 |
| 2009/0097397 A1* | 4/2009 | Moreira Sa de Souza | H04L 41/0636 |
| | | | 370/216 |
| 2009/0165018 A1* | 6/2009 | Junqueira | G06F 9/5061 |
| | | | 719/313 |
| 2009/0265516 A1 | 10/2009 | Prabhu | |
| 2010/0098090 A1* | 4/2010 | Westhoff | H04L 9/008 |
| | | | 370/400 |
| 2010/0098102 A1* | 4/2010 | Banks | H04W 52/0235 |
| | | | 370/406 |
| 2013/0275626 A1 | 10/2013 | Kim | |
| 2013/0346365 A1* | 12/2013 | Kan | G06F 3/061 |
| | | | 707/610 |
| 2014/0012810 A1* | 1/2014 | Chen | G06F 16/27 |
| | | | 707/610 |
| 2014/0149355 A1* | 5/2014 | Gupta | G06F 11/1446 |
| | | | 707/652 |
| 2015/0280959 A1* | 10/2015 | Vincent | G06F 16/1774 |
| | | | 709/203 |
| 2015/0379009 A1* | 12/2015 | Reddy | G06F 16/2255 |
| | | | 707/747 |
| 2017/0141971 A1* | 5/2017 | Ainsworth | G06F 11/0709 |
| 2017/0195303 A1* | 7/2017 | Smith | H04W 12/04 |
| 2018/0150230 A1* | 5/2018 | Schreter | G06F 11/2097 |
| 2018/0173745 A1* | 6/2018 | Balasubramanian | G06F 16/2336 |
| 2018/0219946 A1* | 8/2018 | Farrahi Moghaddam | G06F 11/1474 |
| 2018/0349039 A1* | 12/2018 | Dhuse | G06F 3/061 |

* cited by examiner

PROVIDING CONSISTENCY IN A DISTRIBUTED DATA STORE

BACKGROUND OF THE INVENTION

In a distributed storage system, values may be written to and stored across a plurality of nodes. When consecutive read requests for a key with no intervening writes are received, the same value should be returned. However, in some instances, one or more nodes of the distributed system may go offline and online sporadically during a write operation. As a result, it is possible that various read requests to the same value that has not changed may return inconsistent values depending on the timing of the request at various different failure states of the nodes. Maintaining read-after-read consistency of a value is important in many applications.

BRIEF DESCRIPTION OF THE DRAWINGS

Various embodiments of the invention are disclosed in the following detailed description and the accompanying drawings.

DETAILED DESCRIPTION

Figure 1:
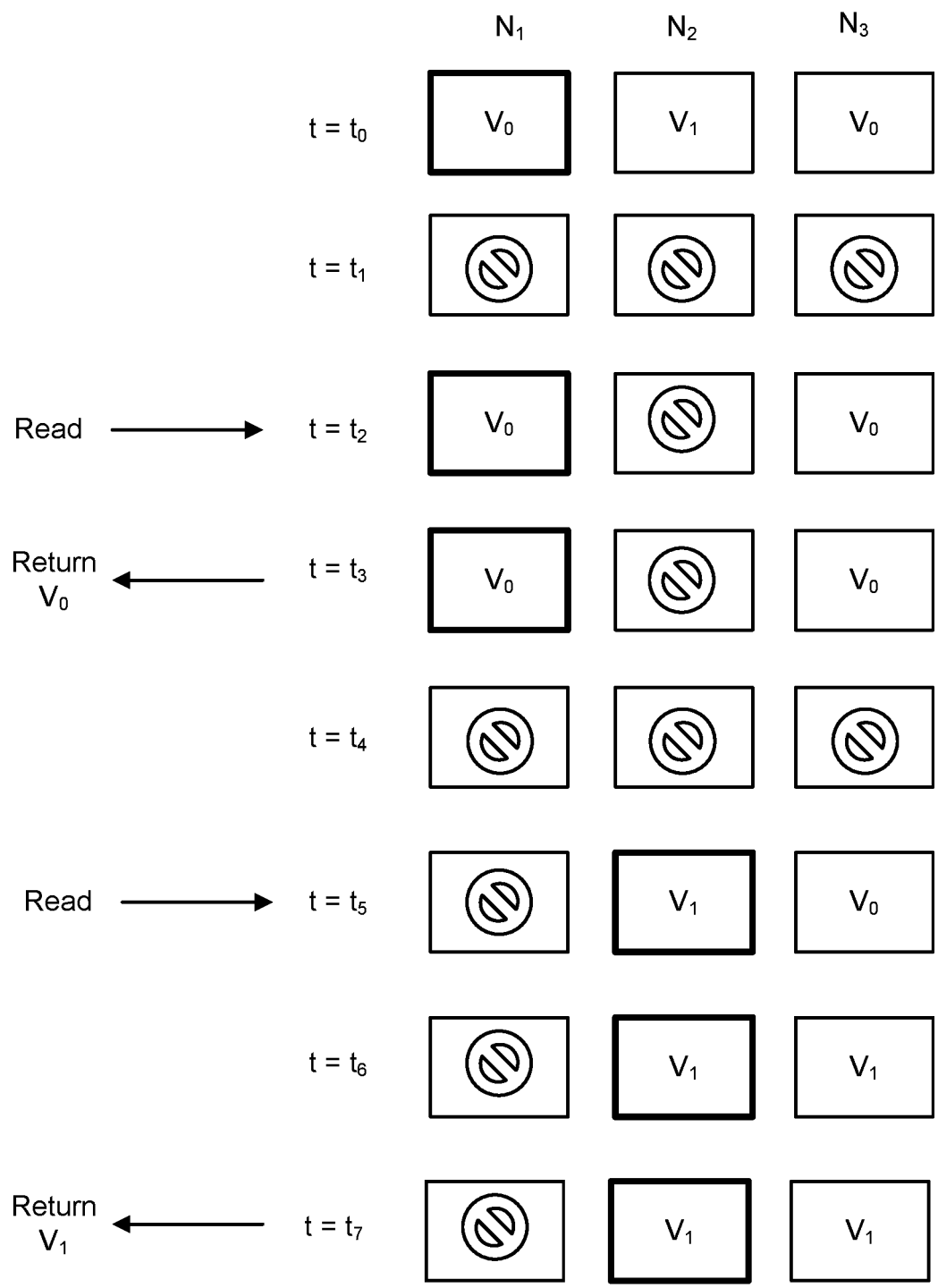
FIG. 1 is a block diagram illustrating a process for reading the key-value store entries associated with a key.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Maintaining read consistency is disclosed. A distributed system may store a key-value store across a plurality of nodes. A key-value store may store a plurality of key-value pairs in corresponding entries of the key-value store. To provide fault tolerance across the distributed system, each node may store its own version of the key-value store. Each version of the key-value store may store the entire or a portion of the key-value store. Each version of the key-value store may include a corresponding entry for the same key. An entry stores a version of the value for a key of a key-value pair. When a key is written to the key-value store, to reduce the number of transactions needed to maintain the key-value store, the key is written to the key-value store of a selected majority of the nodes instead of each of the plurality of nodes. As a result, the corresponding entries in the key-value stores may store different values for a particular key. When a key is updated, the key-value store of a selected majority of the nodes is modified to reflect the update.

Consensus protocols (e.g., PAXOS) may require that a group of nodes should agree upon a value when a read request is received. However, consensus problems emerge when a write operation is incomplete, one of the nodes goes offline, and a read request is received. Some of the nodes store the write value and other nodes store a previous write value or a blank value. It may be unclear which value to return when a read request is received. FIG. 1 illustrates such a problem. FIG. 1 is a flow chart illustrating a process for reading the key-value store entries associated with a key $k_1$. As seen in the example, at $t=t_0$, the entry for node $N_2$ stores a value $V_1$ for the key $k_1$ and the entries for nodes $N_1$ and $N_3$ store a value $V_0$ for the key $k_1$. $V_0$ may be a blank value, a default value, or an initial value. Node $N_1$ is the leader node. A leader node is the node of the majority of nodes that receives a read/write request. When a read request is received, the leader node determines a consensus value for the key by selecting a majority of the nodes and inspecting the entries corresponding to the key of the selected nodes for the value associated with the key. When a write request is received, the leader node propagates the write value to a majority of the nodes. At $t=t_1$, the nodes go offline. At $t=t_2$, nodes $N_1$ and $N_3$ come back online, node $N_1$ is the leader node, but node $N_2$ remains offline. A read request for the value associated with key $k_1$ is received. The leader node $N_1$ inspects a majority of the nodes for the value associated with the key $k_1$. In this instance, the majority value for the key $k_1$ is $V_0$ and at $t=t_3$, leader node $N_1$ returns $V_0$.

At $t=t_4$, the nodes go offline again. At $t=t_5$, nodes $N_2$ and $N_3$ come back online, but node $N_1$ remains offline. Since node $N_1$ is offline, another node may be elected as a temporary leader node. In this example, node $N_2$ is elected as the temporary leader node. A read request for the value associated with the key $k_1$ is received. Temporary leader node $N_2$ inspects the entries corresponding to the key of a selected majority of the nodes for the value associated with the key. Temporary leader node $N_2$ determines that a conflict for the value associated with the key $k_1$ exists between nodes $N_2$ and $N_3$. Since $N_2$ is the leader node at $t=t_6$, temporary leader node $N_2$ propagates its stored value for the key $k_1$ to a majority of the nodes. At $t=t_7$, the majority value for the key $k_1$ is $V_1$ and temporary leader node $N_2$ returns $V_1$ as the value associated with the key $k_1$.

The example illustrates a violation of a read-after-read consistency because two consecutive read requests to the same corresponding entry for a particular key across the distributed system returned two different values. Such a violation poses a serious problem for distributed systems. Read-after-read consistency means that any two successive reads will return the same value, unless, a write operation occurred between the two reads.

Read-after-read consistency may be achieved by writing an intent indicator to a selected at least one less than a majority of the nodes in response to a write request associated with a key. The intent indicator is an indication that a value of a key is in the process of being updated. When the distributed system receives a write request or read request, the request is forwarded to the leader node. In some embodiments, the request is made to the leader node. A node of the plurality of nodes is elected as a primary leader node. The intent indicator may include a sequence number that indicates a position of the write operation in the sequence of write operations with respect to other write operations performed by the system. In some embodiments, the intent indicator does not include a sequence number, but the intent indicator indicates that it was written after a value to which the write indication references. In some embodiments, the set of nodes that is at least one less than a majority of the nodes includes the leader node. In other embodiments, the set of nodes that is at least one less than a majority of the nodes does not include the leader node. After the intent indicator is written to at least one less than a majority of the nodes, the write value may be written to a selected majority of the nodes. In some embodiments, the selected majority of the nodes does not include any of the nodes in the set of nodes that is at least one less than a majority of the nodes. In some embodiments, the leader node is included in both the selected majority of the nodes and the set of nodes that is at least one less than a majority of the nodes. The write value also includes a sequence number, but the sequence number of the write value is a value that is greater than the sequence number of a previously written value and the intent indicator associated with the previously written value. The selected majority of the nodes includes the leader node. In some embodiments, the leader node is the first node of the selected majority of the nodes to which the write value is written. In other embodiments, the leader node is the last node of the selected majority of nodes to which the write value is written. In other embodiments, the leader node is neither the first node nor the last node of the selected majority of the nodes to which the write value is written. When a read request for a key is received, the leader node selects a majority of the nodes from the plurality of nodes and inspects the entries corresponding to the key of the selected nodes to determine a consensus value for the key and the consensus value is returned.

In some embodiments, a write operation may be incomplete and a read request may be received. A write operation may be incomplete, for example, because one or more nodes may go offline before the write operation is completed. The write operation may be interrupted before the intent indicator is written to at least one less than a majority of the nodes and a read request is received. Also, a write operation may be interrupted before the write value is written to a majority of the nodes and a read request is received. To service the read request, a leader node may inspect the entries corresponding to the key of a selected majority of nodes to determine a write operation associated with a latest sequence number. The write operation associated with the latest sequence number (e.g., current value, write value) may be propagated to the selected majority of nodes.

In some embodiments, an intent indicator is the write operation with a latest sequence number. If among the nodes the value with latest sequence number has an intent indicator, the intent indicator is converted to the current value with a higher sequence number and propagated to a majority of the nodes.

In other embodiments, the write value is the write operation with the latest sequence number and is propagated to the entries corresponding to the key of a selected majority of nodes. After the value with the latest sequence number is propagated to a selected majority of nodes, the value with the latest sequence number is returned.

The use of intent indicators and sequence numbers helps to ensure read-after-read consistency. Also, such a use ensures that the nodes are fault tolerant in the event one or more of the nodes goes offline.

Figure 2:
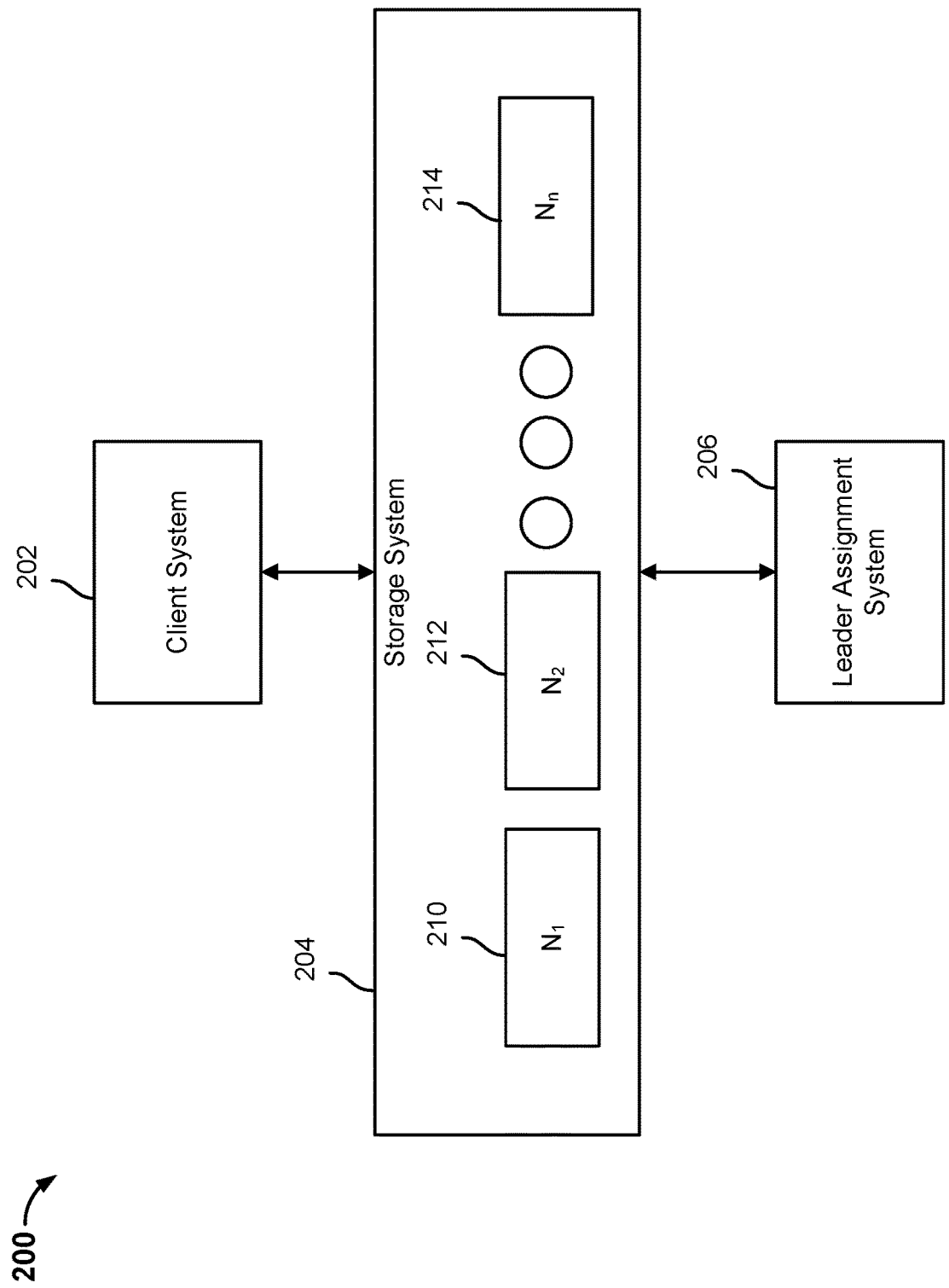
FIG. 2 is a block diagram illustrating an embodiment of a system for a distributed storage system that maintains read-after-read consistency.

FIG. 2 is a block diagram illustrating an embodiment of a system for a distributed storage system that maintains read-after-read consistency. System 200 includes a client system 202, a storage system 204, and a leader assignment system 206.

Client system 202 may be comprised of one or more servers, one or more computing devices, one or more storage devices, and/or a combination thereof. Client system 202 may be configured to send a write request to update a distributed key-value store stored at storage system 204. Client system 202 may be configured to send a write request to modify the distributed key-value store stored at storage system 204 to include a new key-value pair. Client system 202 may be configured to send a read request to storage system 204. The read request may be for one or more values associated with one or more keys of the distributed key-value store stored at storage system 204. The value of a key-value pair may include metadata associated with a file, such as file size, directory structure, file permissions, physical storage location of the file, etc.

Storage system 204 is comprised of a plurality of N nodes. In some embodiments, N is an odd number. Storage system 204 may store a distributed key-value store across the plurality of N nodes. To provide fault tolerance across the distributed system, each node may store its own version of the key-value store. Each version of the key-value store may store the entire or a portion of the key-value store. Each version of the key-value store may include a corresponding entry for the same key. An entry stores a version of the value for a key of a key-value pair. When a key is written to the key-value store, to reduce the number of transactions needed to maintain the key-value store, the key is written to the key-value store of a selected majority of the nodes instead of each of the plurality of nodes. As a result, the corresponding entries in the key-value stores may store different values for a particular key. When a key is updated, the key-value store of a selected majority of the nodes is modified to reflect the update.

Storage system 204 may protect a large volume of applications while supporting tight business requirements (recovery time objective (RTO) and recovery point objective (RPO)). Storage system 204 may unify end-to-end protection infrastructure—including target storage, provide backup, replication of data, disaster recovery, and/or cloud tiering. Storage system 204 may provide scale-out, globally deduped, highly available storage to consolidate all secondary data, including backups, files, and test/dev copies. Storage system 204 simplifies backup infrastructure and eliminates the need to run separate backup software, proxies, media servers, and archival. Storage system 204 may be fully integrated with a virtual machine (VM) centralized management tool, such as vCenter, and an applications programming interface (API) for data protection. Storage system 204 may reduce the amount of time to perform RPOs and support instantaneous RTOs by creating a clone of a backup VM and running the VM directly from Storage system 204. Storage system 204 may integrate natively with one or more cloud servers. Storage system 204 may replicate data to a one or more cloud clusters to minimize potential data loss by replicating data as soon as a backup is completed. This allows data in the cloud to be used for disaster recovery, application migration, test/dev, or analytics.

Leader assignment system 206 may be configured to elect one of the nodes of storage system 204 to be a primary leader node. In the event the primary leader node goes offline, leader assignment system 206 may be configured to elect another node of storage system 204 to be a temporary leader node. Leader assignment system 206 may be configured to receive a heartbeat signal from the primary leader node and in the event the leader assignment system 206 does not receive the heartbeat signal after a threshold duration, the leader assignment system 206 may be configured to elect another node to be the temporary leader node.

Leader assignment system 206 may be configured to assign a leader node (primary or temporary) with an epoch leader instance number. The epoch leader instance number indicates a relative leader order in which a node is the leader node. Storage system 204 may store a distributed key-value store across the plurality of nodes where each node stores at least a portion of the key-value store. The value associated with each key may store a corresponding epoch leader instance number of the leader that performed the last write to the key. When the primary leader node goes offline, another node may be elected to be a temporary leader node, and one or more writes may occur to the distributed key-value store. When the primary leader nodes comes back online, it resumes its status as the leader node and may update its key-value store to ensure that it is up-to-date. The primary leader node may query one less than a majority of the nodes for key-value pairs with a corresponding epoch leader number that is greater than the epoch leader number of when the primary leader node was previously the primary leader node with up-to-date data. The primary leader node may query the other one or more temporary leader nodes for key-value pairs with a corresponding epoch leader number that is greater than the epoch leader number of when the primary leader node was previously the primary leader node with up-to-date data. The primary leader node may receive one or more key-value pairs and update its key-value store. In some embodiments, the primary leader node comes back online before any read or write operations are performed with respect to the distributed key-value store. In other embodiments, the primary leader node may be assigned a new epoch leader instance number that is the next epoch leader instance number in the relative leader order. Once the primary leader node is caught up, i.e., has updated all the key-value pairs for the missed updates as above, the primary leader node may serve as an authoritative node and return the value stored in a corresponding entry for a key, regardless of what other entries for the key in other nodes store.

Leader Assignment System 206 may be a computer system with a processor, a memory, and one or more storage devices. Leader Assignment System 206 may be comprised of one or more servers, one or more computing devices, one or more storage devices, and/or a combination thereof.

Figure 3:
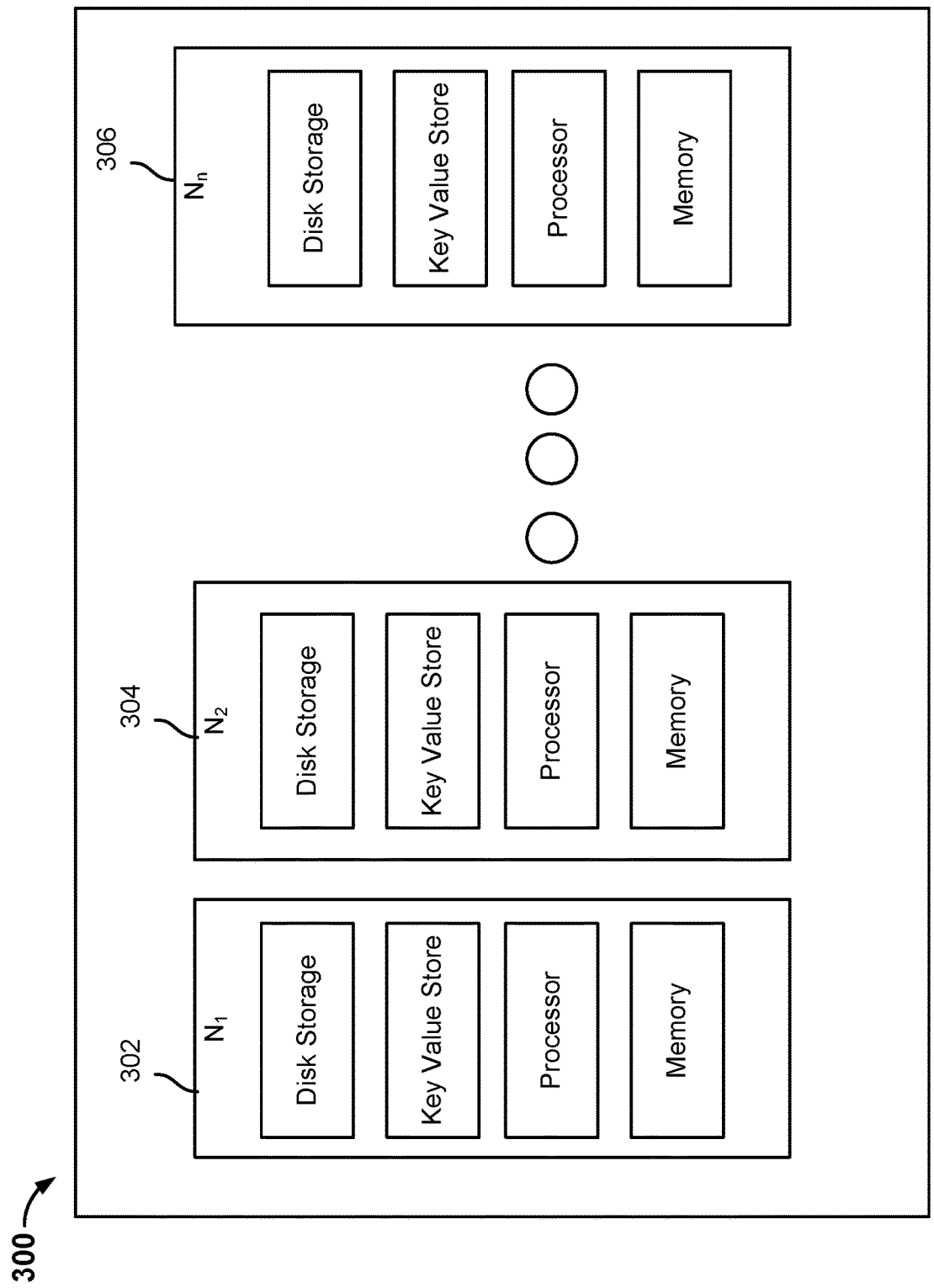
FIG. 3 is a block diagram illustrating an embodiment of a storage system.

FIG. 3 is a block diagram illustrating an embodiment of a storage system. In the example shown, storage system 300 may be implemented as a storage system, such as system 204. Storage system 300 may be comprised of nodes 302, 304, 306. In the example shown, each node may include a corresponding disk storage, a corresponding key value store, a corresponding processor, and a corresponding memory. Each node may store a portion of the key value store that is distributed across the plurality of nodes. Each key of the key value store may be stored across a majority of the nodes. In some embodiments, the number of nodes N is an odd number.

In some embodiments, one of the nodes 302, 304, 306 is elected to be a primary leader node. The primary leader node is a node that services a read and/or write request received from a client system. In the event a read request for a value associated with a key is received, the primary leader node determines a consensus value that is stored by a selected majority of the nodes and returns the consensus value. In the event a write request to a value associated with a key is received, the primary leader node selects at least one less than a majority of the nodes and writes an intent indicator to the selected one less than a majority of the nodes. In some embodiments, the selected at least one less than a majority of the nodes includes the primary leader node. In other embodiments, the selected at least one less than a majority of the nodes does not include the primary leader node. The intent indicator is an indication that a value of a key is in the process of being updated. Subsequently, the primary leader node selects a majority of the nodes and writes the value associated with the key to the selected majority of nodes. In some embodiments, the selected majority of the nodes does not include any of the nodes that are included in the selected at least one less than a majority of the nodes. In some embodiments, the selected majority of the nodes overlaps with one node of the selected at least one less than a majority of the nodes (e.g., primary leader node). In some embodiments, the primary leader node is the first node of the selected majority of the nodes to which the value is written. In some embodiments, the primary leader node is the last node of the selected majority of the nodes to which the value is written. In other embodiments, the primary leader node is neither the first node nor the last node of the selected majority of the nodes to which the value is written.

In some embodiments, the key value store of the primary leader node includes the keys and associated values for all the keys in the distributed key value store. In some embodiments, the primary leader node is caught up and services a read request by returning the value stored in its key value store without determining a consensus value stored by a majority of the nodes. In other embodiments, the key value store of the primary leader node includes the keys and associated values for some of the keys in the distributed key value store.

In some embodiments, one of the nodes 302, 304, 306 is elected to be a temporary leader node in the event the primary leader node goes offline. When one of the nodes is a temporary leader node, the node services read and/or write requests received from a client system. Similar to the primary leader node, in the event a read request for a value associated with a key is received, the temporary leader node determines a consensus value that is stored by a selected majority of nodes and returns the consensus value. In the event a write request to a value associated with a key is received, the temporary leader node selects at least one less than a majority of nodes and writes an intent indicator to selected nodes. In some embodiments, the selected at least one less than a majority of the nodes includes the temporary leader node. In some embodiments, the selected at least one less than a majority of the nodes does not include the temporary leader node. The intent indicator is an indication that a value of a key is in the process of being updated. Subsequently, the temporary leader node selects a majority of the nodes and writes the value associated with the key to the selected majority of nodes. The temporary leader node is included in the majority of nodes. In some embodiments, the temporary leader node is the first node of the selected majority of the nodes to have the value associated with the key written to it. In some embodiments, the temporary leader node is the last node of the selected majority of the nodes to have the value associated with the key written to it. When the primary leader node returns online, the temporary leader node is configured to return to its normal role as a secondary node. The primary leader node is configured to serve as the authoritative node.

Figure 4:
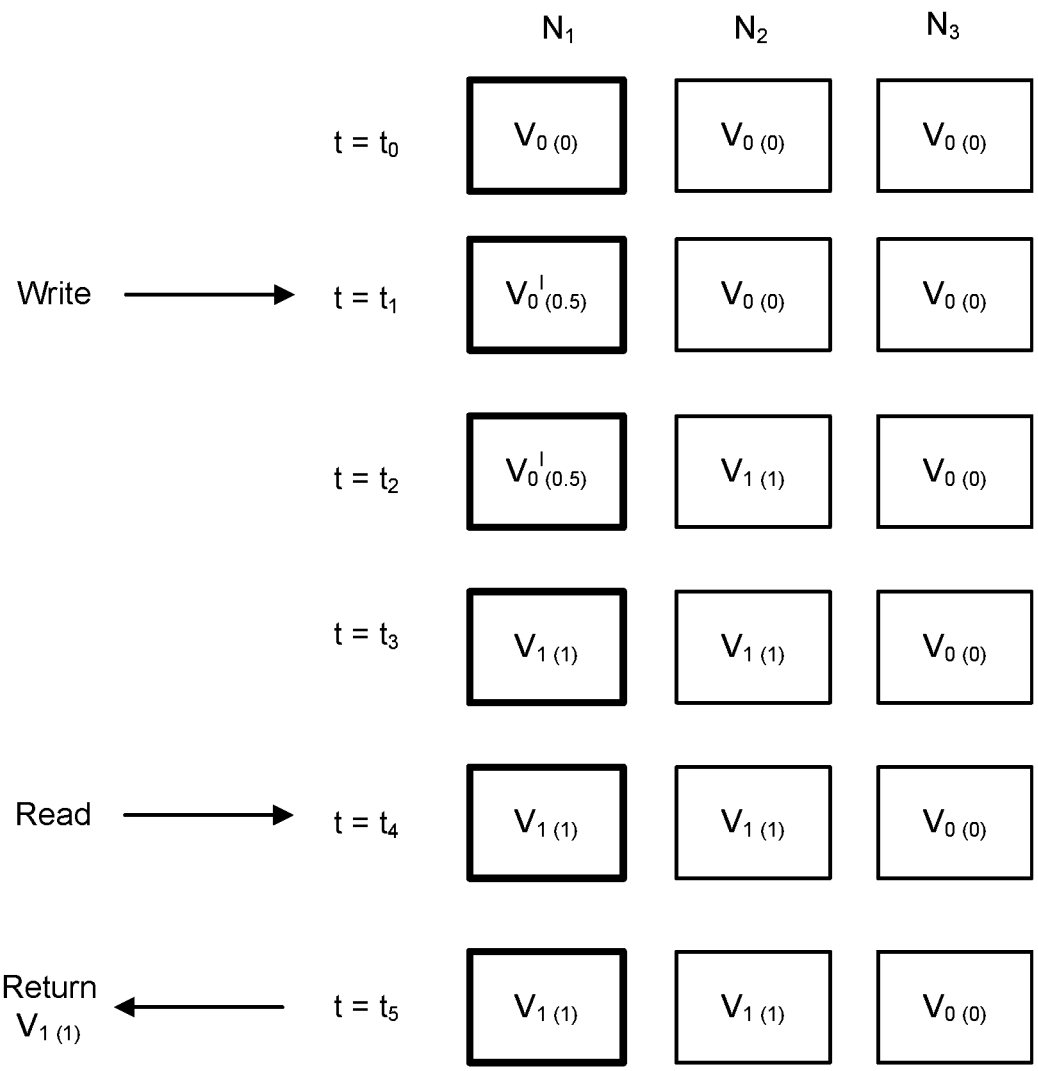
FIG. 4 is a block diagram illustrating an embodiment of a process for performing a write operation and a read operation.

FIG. 4 is a block diagram illustrating an embodiment of a process for performing a write operation and a read operation. In the example shown, process 400 may be implemented by a storage system, such as storage system 204.

At $t=t_0$, nodes $N_1$, $N_2$, and $N_3$ each store $V_{0(0)}$ associated with a key $k_1$. $V_{0(0)}$ may be a blank value, a default value, or an initial value. Node $N_1$ is the leader node. A leader node is the node of the majority of nodes that services a read/write request received from a client system.

At $t=t_1$, a write request associated with the key $k_1$ is received. Instead of writing the value associated with the key $k_1$ to the leader node $N_1$, an intent indicator is written to the entry corresponding to the key for at least one less than a majority of the nodes. The intent indicator is an indication that a value of key $k_1$ is in the process of being updated. The at least one less of a majority of the nodes may include the leader node $N_1$. In this example, there are three nodes. A majority of the nodes is two nodes. One less than a majority of the nodes is one node. The intent indicator is written to the leader node $N_1$.

Each write operation (e.g., intent indicator, write value) has an associated sequence number. The sequence number indicates a position of the write operation in the sequence with respect to other write operations performed by the storage system. The sequence number may be an integer or a non-integer. The sequence number may be a monotonically increasing number. In the example shown, the intent indicator $V_0^I{}_{(0.5)}$ has a sequence number of "0.5."

From $t=t_2$ to $t=t_3$, the value associated with the key $k_1$ is written to the entries corresponding to the key of a selected majority of nodes. In this example, $V_{1(1)}$ is written to node $N_2$ and has a sequence number of "1." The value $V_{1(1)}$ has a sequence number that is greater than the intent indicator $V_0^I{}_{(0.5)}$. This indicates that the write of $V_1$ has occurred after the write of $V_0^I$. At $t=t_3$, the value $V_{1(1)}$ is written to the leader node. In this example, the selected majority of the nodes includes nodes $N_1$ and $N_2$. In other embodiments, the selected majority of the nodes may include $N_2$ and $N_3$ or $N_1$ and $N_3$.

At $t=t_4$, a read request for the value associated with the key $k_1$ is received at the leader node $N_1$. When a read request is received, the leader node determines a consensus value for the key by inspecting the entries corresponding to the key of a selected majority of the nodes for the value associated with the key. In the event a quorum of the selected majority of the nodes do not store the same value associated with a key, the leader node may propagate the value with the latest sequence number to the selected majority of nodes and return the propagated value. In the event a quorum of the selected majority of the nodes store the same value associated with the key, i.e, a consensus value, the leader node returns the consensus value.

In the example shown, the leader node $N_1$ determines the value associated with the key $k_1$ that is stored at a quorum of the selected majority of nodes and at $t=t_5$, the leader node $N_1$ returns the consensus value, which in this example, is $V_{1(1)}$.

Figure 5:
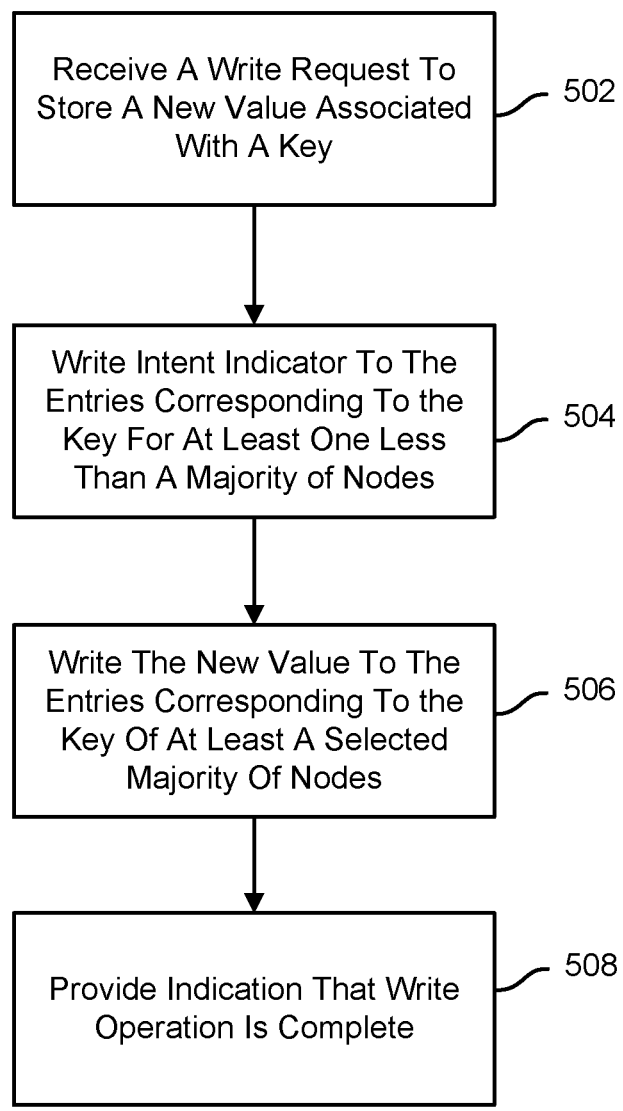
FIG. 5 is a flow chart illustrating an embodiment of a process for writing a value associated with a key to a majority of the nodes.

FIG. 5 is a flow chart illustrating an embodiment of a process for writing a value associated with a key to a majority of the nodes. Process 500 may be implemented by a leader node, such as one of the nodes 302, 304, 306.

At 502, a write request to store a new value associated with a key is received. The write request may be to modify the value of an existing key stored in a key-value database or to create a new key-value pair for the key-value database. The write request associated with the key is received by a leader node of the plurality of nodes. A node of the plurality of nodes may be assigned to be the leader node by a leader assignment system. The leader node may be a primary leader node. In the event the primary leader node is offline, the leader node may be a temporary leader node.

At 504, an intent indicator is written to the entries corresponding to the key for at least one less than a majority of the nodes. The at least one less than a majority of the nodes may include the leader node. The leader node may be the first node of the one less than a majority of the nodes to have the intent indicator written to its key value database. The intent indicator is an indication that a value of a key is in the process of being updated. The intent indicator includes an associated sequence number. The sequence number indicates a position of the intent indicator in the sequence with respect to other write operations performed by the storage system.

At 506, the write value is written to the entries corresponding to the key of at least a selected majority of nodes. The majority of the nodes includes the leader node. The leader node may be the last node of the majority of the nodes to have the write value written to it. The leader node may be the first node of the majority of the nodes to have the write value written to it. In some embodiments, the selected majority of the nodes does not include any nodes that are part of the at least one less than a majority of the nodes. In some embodiments, the leader node is part of the selected majority of the nodes and at least one less than the majority of the nodes.

In some embodiments, the intent indicator for the key is cleared from the nodes to which it was written.

At 508, an indication that the write is complete is provided to a file system manager of the storage system. The indication notifies that the write operation was completed and not interrupted.

Figure 6A:
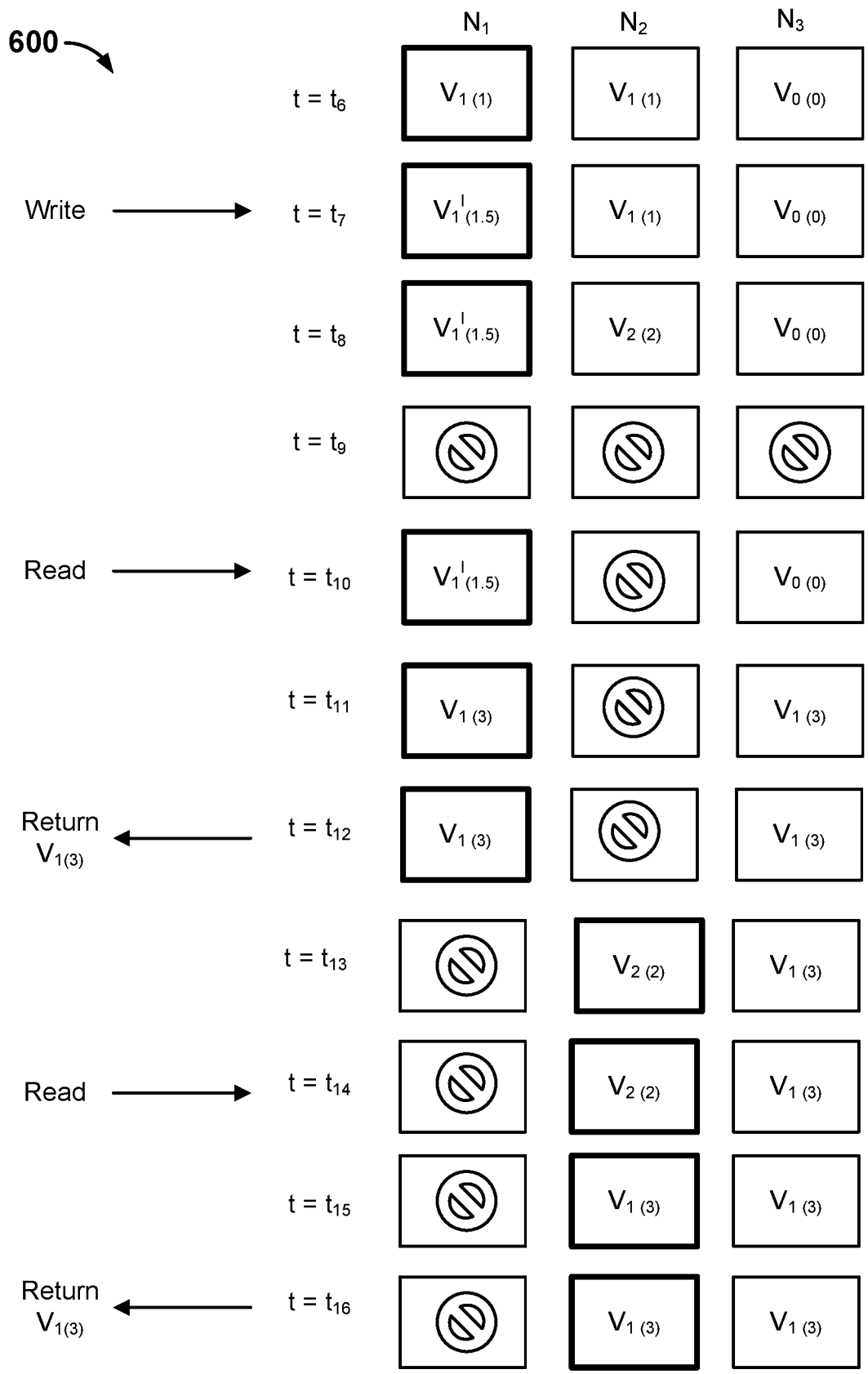
FIG. 6A is a block diagram illustrating an embodiment of a process for read-after-read consistency.

FIG. 6A is a block diagram illustrating an embodiment of a process for read-after-read consistency. In the example shown, process 600 may be implemented by a storage system, such as storage system 204. FIG. 6A may be a continuation of FIG. 4.

At $t=t_6$, nodes $N_1$ and $N_2$ store a value $V_{1(1)}$ associated with the key $k_1$. Node $N_1$ is the leader node. Node $N_3$ stores a value $V_{0(0)}$ for the key $k_1$. $V_{0(0)}$ may be a blank value, a default value, or an initial value. At $t=t_7$, a write request associated with the key $k_1$ is received. An intent indicator of $V_1^I{}_{(1.5)}$ is written to the entries corresponding to the key of at least one less than a majority of the nodes. The at least one less of a majority of the nodes may include the leader node $N_1$. In this example, there are three nodes. A majority of the nodes is two nodes. One less than a majority of the nodes is one node. The intent indicator is written to the leader node $N_1$.

At $t=t_8$, the leader node begins writing the value $V_{2(2)}$ to the entries corresponding to the key of a selected majority of the nodes. The selected majority of the nodes includes the leader node. The leader node may be the last node of the majority of the nodes to have the value $V_{2(2)}$ written to it. In this example, the value $V_{2(2)}$ is written to $N_2$. In the example shown, the value $V_{2(2)}$ has a sequence number that is greater than the sequence number of the intent indicator $V_1^I{}_{(1.5)}$. This indicates that the write of $V_2$ has occurred after the write of $V_1^1$.

At $t=t_9$, all the nodes go offline. Thus, the write operation of $V_{2(2)}$ to a majority of the nodes is interrupted and incomplete. At $t=t_{10}$, all of the nodes except for $N_2$ come back online, node $N_1$ is the leader node, and a read request associated with the key $k_1$ is received.

At $t=t_{11}$, the leader node $N_1$ determines the consensus value associated with the key $k_1$ that is stored at a selected majority of nodes. The leader node $N_1$ may determine that a quorum of the selected majority of the nodes store the same value associated with the key $k_1$. The leader node $N_1$ may determine that a quorum of the selected majority of the nodes do not store the same value associated with the key $k_1$. In this example, a quorum of selected majority of nodes do not store the same value associated with the key $k_1$, i.e., there is no consensus value. In some embodiments, since node $N_1$ is the leader node, node $N_1$ determines the write operation with the latest sequence number. In this example, the intent indicator is the write operation with the latest sequence number, but because the intent indicator is not a stored value, but an indication that a value is in the process of being updated, the intent indicator is replaced with the current value for the key. For leader node $N_1$, the current value for the key $k_1$ is $V_1$. The intent indicator is replaced with the current value for the key $k_1$ (i.e., the current value for $V_1$) and propagated to a majority of the nodes. However, when an intent indicator is replaced with a current value, the sequence number associated with the current value is updated to reflect a position of the write in the relative write order with respect to previous write operations. In the example shown, the sequence number is "3."

At $t=t_{12}$, the value $V_{1(3)}$ is returned because that is the consensus value that is stored by a majority of the nodes.

At $t=t_{13}$, node $N_1$ goes offline and node $N_2$ comes back online. A leader assignment system may assign node $N_2$ to be a temporary leader node. As seen in FIG. 6A, node $N_2$ stores a value $V_{2(2)}$ and node $N_3$ stores a value $V_{1(3)}$.

At $t=t_{14}$, a read request associated with the key $k_1$ is received. The temporary leader node determines a consensus value that is stored by a majority of the nodes. In this example, there is no consensus value because one node stores $V_{2(2)}$ and another node stores $V_{1(3)}$. In the event there is no consensus value, the leader node may select the write operation with the latest sequence number to be the consensus value. In this example, the value $V_{1(3)}$ is the value with the latest sequence number because "3" is greater than "2."

At $t=t_{15}$, the value associated with the write operation with the latest sequence number is propagated to the selected majority of the nodes. In this example, the value $V_{1(3)}$ is propagated to node $N_2$.

At $t=t_{16}$, the consensus value is returned. Unlike the read-after-read requests illustrated in FIG. 1, the use of intent indicators and sequence numbers ensures read-after-read consistency after an incomplete write operation.

Figure 6B:
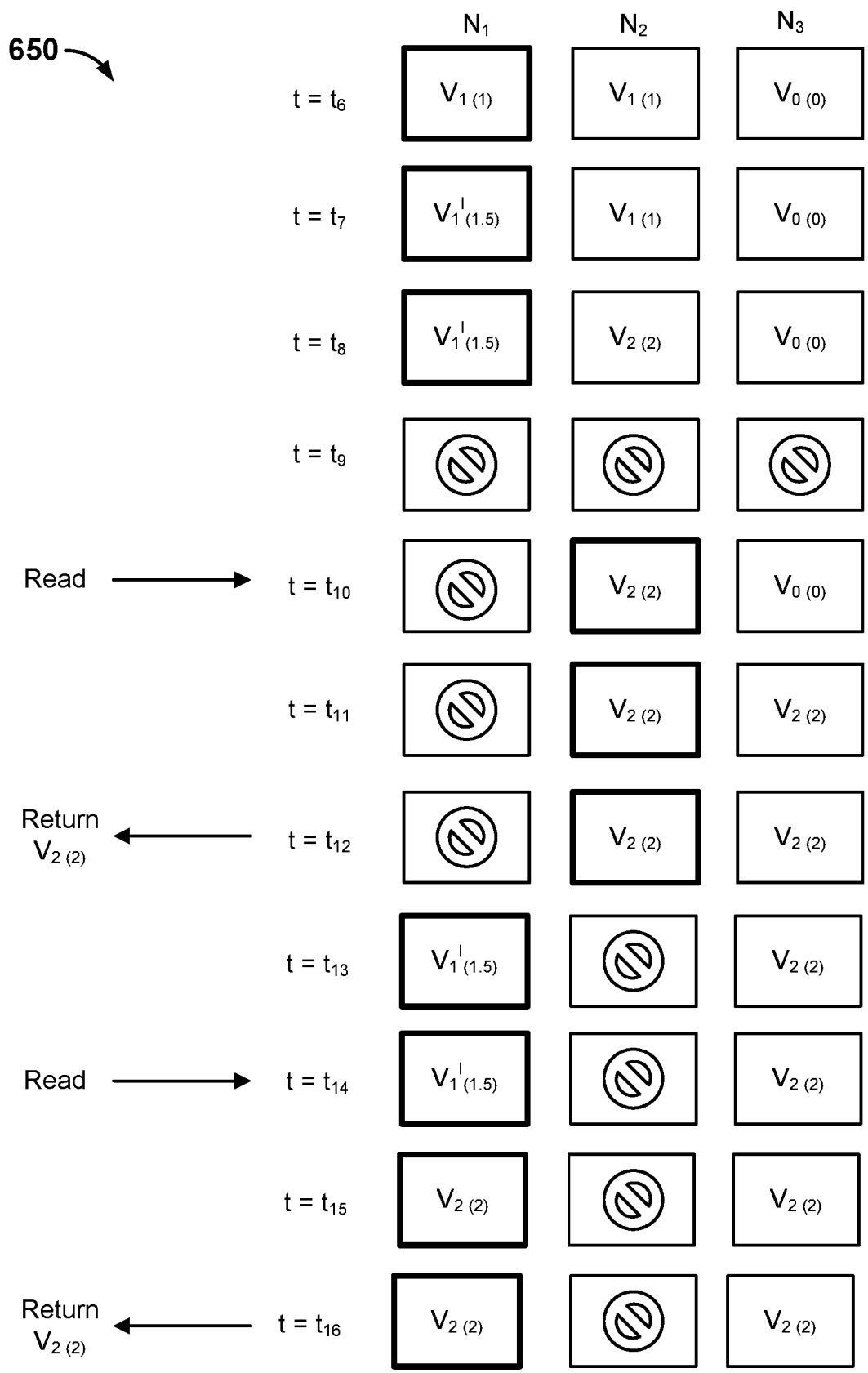
FIG. 6B is a block diagram illustrating an embodiment of a process for read-after-read consistency.

FIG. 6B is a block diagram illustrating an embodiment of a process for read-after-read consistency. In the example shown, process 600 may be implemented by a storage system, such as storage system 204. FIG. 6B may be a continuation of FIG. 4.

At $t=t_6$, nodes $N_1$ and $N_2$ store a value $V_{1(1)}$ associated with the key $k_1$. Node $N_1$ is the leader node. Node $N_3$ stores a value $V_{0(0)}$ for the key $k_1$. $V_{0(0)}$ may be a blank value, a default value, or an initial value. At $t=t_7$, a write request associated with the key $k_1$ is received. An intent indicator of $V_1^I{}_{(1.5)}$ is written to the entries corresponding to the key of at least one less than a majority of the nodes. The at least one less of a majority of the nodes may include the leader node $N_1$. In this example, there are three nodes. A majority of the nodes is two nodes. One less than a majority of the nodes is one node. The intent indicator is written to the leader node $N_1$.

At $t=t_8$, the leader node begins writing the value $V_{2(2)}$ to the entries corresponding to the key of a selected majority of the nodes. The selected majority of the nodes includes the leader node. The leader node may be the last node of the majority of the nodes to have the value $V_{2(2)}$ written to it. In this example, the value $V_{2(2)}$ is written to $N_2$. In the example shown, the value $V_{2(2)}$ has a sequence number that is greater than the sequence number of the intent indicator $V_1^I{}_{(1.5)}$. This indicates that the write of $V_2$ has occurred after the write of $V_1^I$.

At $t=t_9$, all the nodes go offline. Thus, the write operation of $V_{2(2)}$ to a majority of the nodes is interrupted and incomplete. At $t=t_{10}$, all of the nodes except for $N_1$ come back online. Node $N_2$ becomes the temporary leader node because the primary leader node $N_1$ is offline. A read request associated the key $k_1$ is received.

At $t=t_{11}$, the temporary leader node $N_2$ determines the consensus value associated with the key $k_1$ that is stored at a selected majority of nodes. The leader node $N_1$ may determine that a quorum of the selected majority of the nodes store the same value associated with the key $k_1$. The temporary leader node $N_2$ may determine that a quorum of selected majority of the nodes do not store the same value associated with the key $k_1$. In this example, a selected majority of the nodes do not store the same value associated with the key $k_1$, i.e., no consensus value. The leader node determines a write operation that has the latest sequence number and propagates the value associated with the write operation to the selected majority of the nodes. In this example, the value associated with the write operation with the latest sequence number is the write value $V_{2(2)}$. This number has been propagated to node $N_3$.

At $t=t_{12}$, the value $V_{2(2)}$ is returned because that is the consensus value that is stored by a majority of the nodes.

At $t=t_{13}$, node $N_2$ goes offline and node $N_1$ comes back online. A leader assignment system may reassign node $N_1$ to be the primary leader node. As seen in FIG. 6B, node $N_3$ stores a value $V_{2(2)}$ and node $N_1$ stores a value $V_1^I{}_{(1.5)}$.

At $t=t_{14}$, a read request associated with the key $k_1$ is received. The primary leader node determines a consensus value that is stored by a selected majority of the nodes. In this example, there is no consensus value because one node stores $V_{2(2)}$ and another node stores $V_1^I{}_{(1.5)}$. In the event there is no consensus value, the leader node may select the value associated with the write operation with the latest sequence number to be the consensus value. In this example, the value $V_{2(2)}$ is the value with the latest sequence number because "2" is greater than "1.5."

At $t=t_{15}$, the value associated with the write operation with the latest sequence number is propagated to the selected majority of the nodes. In this example, the value $V_{2(2)}$ is propagated to node $N_1$.

At $t=t_{16}$, the consensus value is returned. Unlike the read-after-read requests illustrated in FIG. 1, the use of intent indicators and sequence numbers ensures read-after-read consistency after an incomplete write operation.

Figure 7:
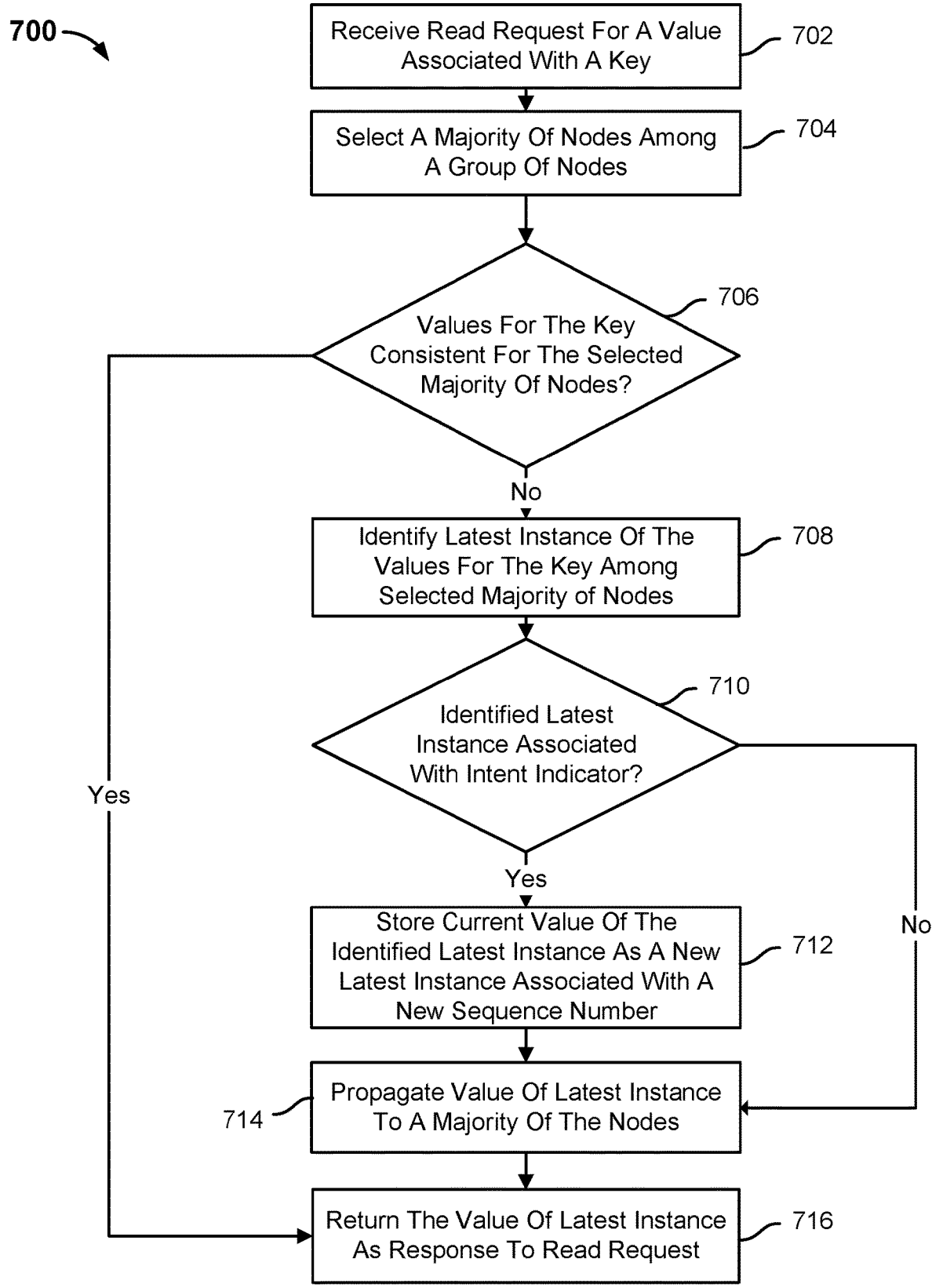
FIG. 7 is a flow chart illustrating an embodiment of a process for reading values of a node.

FIG. 7 is a flow chart illustrating an embodiment of a process for reading values of a node. In the example shown, process 700 may be implemented by a storage system, such as storage system 204.

At 702, a read request for a value associated with a key is received. The read request may be received by a leader node.

At 704, a majority of the nodes among a group of nodes are selected. The selected majority of the nodes includes the leader node. For example, storage system 204 includes N nodes. A majority of the N nodes are selected. If N=5, a majority of the nodes is 3 nodes. The majority of nodes includes nodes that are offline. For example, if N=5 and two nodes are offline, the majority of nodes is still 3 nodes and is not 2 nodes.

At 706, it is determined if the values for the key are consistent for the selected majority of nodes. The leader node may inspect the entries corresponding to the key of the selected majority of the nodes to determine a consensus value associated with the key. The consensus value is a value agreed upon by a quorum of the selected majority of the nodes. In the event the selected majority of the nodes are consistent, then process 700 proceeds to 716. In the event the selected majority of the nodes are inconsistent, then process 700 proceeds to 708.

At 708, a latest instance of the values for the key among the selected majority of nodes is identified. The latest instance value is the write operation stored among the selected majority of the nodes with a latest sequence number. In some embodiments, the latest instance value is an intent indicator. In other embodiments, the latest instance value is a written value. For example, as seen in FIG. 6A, a read request is received at $t=t_{10}$. The latest instance value is $V_1^I{}_{(1.5)}$ because of the available nodes, the intent indicator has the later sequence number. As seen in FIG. 6B, a read request is received at $t=t_{10}$. The latest instance value if $V_{2(2)}$ because of the available nodes, the write value has the later sequence number. In some embodiments, the leader node determines the value it stores associated with the key is the latest instance value.

At 710, it is determined if the identified latest instance is associated with an intent indicator. In the event the identified latest instance is associated with the intent indicator, then process 700 proceeds to 712. In the event the identified latest instance is not associated with the intent indicator, then process 700 proceeds to 714.

At 712, the current value of the identified latest instance is stored as a new latest instance associated with a new sequence number. The intent indicator is converted to a current value associated with the key and the sequence number associated with the current value is also updated. For example, "$V_1^I{}_{(1.5)}$" would be reverted back to "$V_1$," but the sequence number would be increased to the next sequence number, e.g., "3."

At 714, the value of the latest instance is propagated to a majority of the nodes. For example, as seen in FIG. 6A, at $t=t_{11}$, the write value $V_{1(3)}$ is propagated to node $N_3$. As seen in FIG. 6B, at $t=t_{11}$, the write value $V_{2(2)}$ is propagated to node $N_3$.

At 716, the value of the latest instance is returned as response to the read request.

Figure 8:
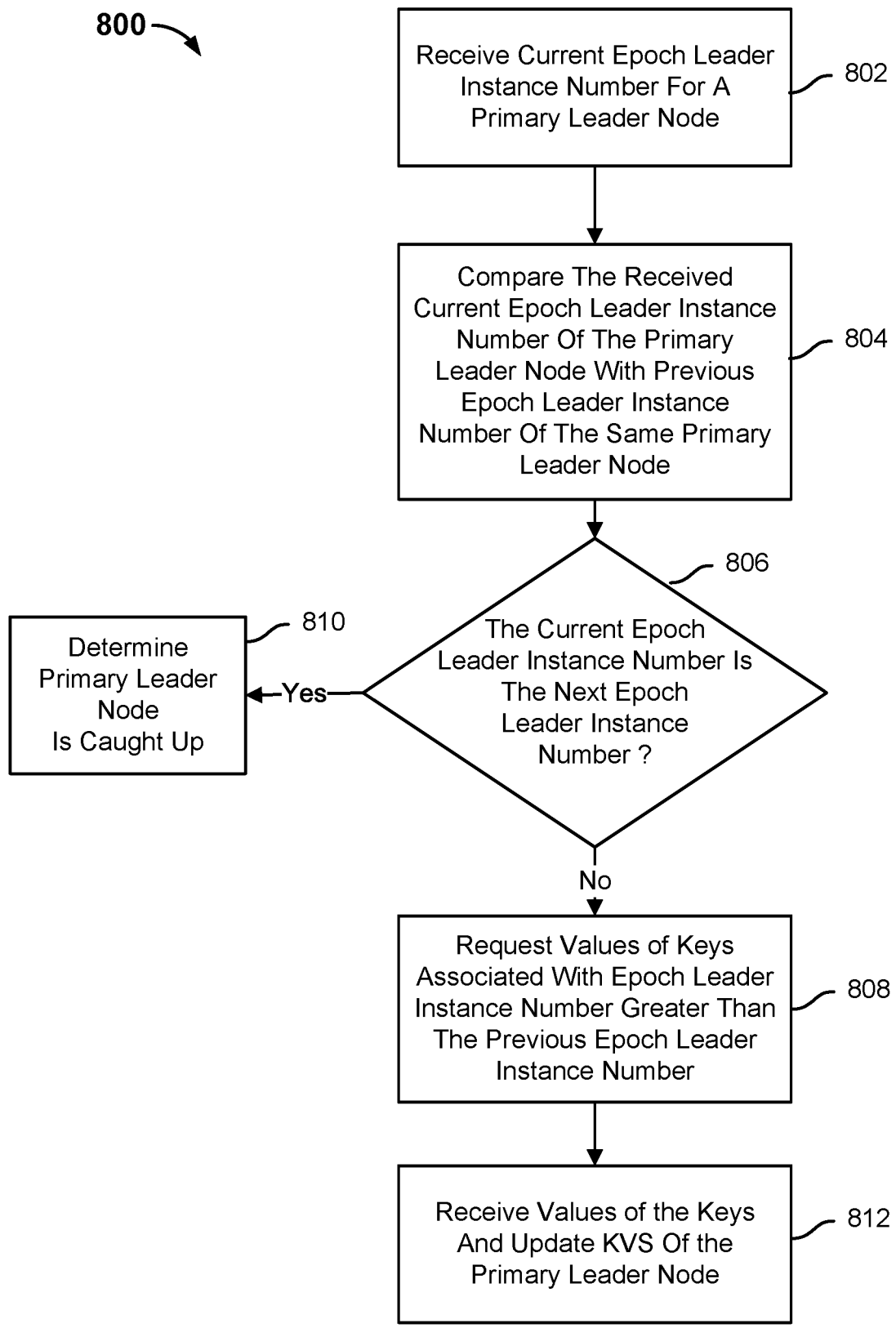
FIG. 8 is a flow chart illustrating an embodiment of a process for updating a leader node.

FIG. 8 is a flow chart illustrating an embodiment of a process for updating a leader node. Process 800 may be implemented by a node, such as nodes 302, 304, 306. A primary leader node may go offline for a period of time. During the period of time, another node may become the temporary leader node. A leader may be elected only if a majority of the nodes are online, otherwise the system is unavailable. When the primary leader node comes back up online, the key value store of the primary leader node needs to be updated with respect to any writes that occurred during the period of time the primary leader node was offline. The one or more temporary leader nodes during the period of time the primary leader node was offline inform the primary leader node of any writes that occurred during the period of time the primary leader node was offline.

At 802, a current epoch leader instance number for a primary leader node is received. The epoch leader instance number indicates a relative leader order in which a node is the leader node. For example, a primary leader node may have an epoch leader instance number of "1" during an initial time period. The primary leader node may go offline and a second node may become the temporary leader node. The period when the second node is the temporary leader node, the second node may have an epoch leader instance number of "2." When the second node is the temporary leader node and the primary leader node is still offline, the second node may go offline, and a third node may become the temporary leader node. During this period, the third node may have an epoch leader instance number of "3." When the primary leader node comes back online, it resumes its leader node status and may have an epoch leader instance number of "4."

At 804, the received current epoch leader instance number of the primary leader node is compared with the previous epoch leader instance number of the same primary leader node. For example, the primary leader node may compare the epoch leader instance number of "1" with the epoch leader instance number of "4."

At 806, it is determined if the current epoch leader instance number of the node is the next epoch leader instance number of the relative leader order. For example, a primary leader node may have an epoch leader instance number of "1," go offline, come back online before another node is assigned to be a temporary leader node, and be assigned an epoch leader instance number of "2." In the event the current epoch leader instance number is equal to the next epoch leader instance number, then process 800 proceeds to 810. In the event the current epoch leader instance number is not equal to the next epoch leader instance number, then process 800 proceeds to 808.

At 808, the values of keys associated with an epoch leader instance number that is greater than the previous epoch leader instance number of the primary leader node are requested. A key may have metadata that indicates an epoch leader value with which it is associated. For example, the primary leader node may request from the one or more temporary leader nodes, (e.g., the second node and third node), the one or more keys with an epoch leader instance number that is greater than "1."

At 808, the values of the keys are received and the key-value store of the primary leader node is updated. The one or more requested keys and associated values may be received from the second node and the third node.

At 810, it is determined that the leader node is caught up.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a request to store a new value to a key to be fault tolerant across a plurality of storage nodes of a storage system;
   in response to the received request to store the new value to the key:
   writing an intent indicator to the key in at least one less than a majority of the plurality of storage nodes, wherein the intent indicator has a corresponding sequence number wherein the corresponding sequence number of the intent indicator is greater than a sequence number of a stored value of the key, wherein the intent indicator indicates that the key is an intermediate state; and
   storing, as a next value instance of the key, the new value of the key in some of the storage nodes, wherein the new value of the key has a corresponding sequence number, wherein the corresponding sequence number of the new value of the key is greater than the corresponding sequence number of the intent indicator;
   receiving a request to read a stored value of the key;
   determining a latest value instance of the key among a majority of the plurality of the storage nodes based on a sequence number of the key; and
   returning the determined latest value instance of the key.

2. The method of claim 1, wherein one of the plurality of storage nodes is elected to be a primary leader node.

3. The method of claim 1, further comprising storing the new value of the key to the majority of the plurality of storage nodes.

4. The method of claim 3, wherein the majority of the plurality of storage nodes includes a primary leader node.

5. The method of claim 4, wherein the primary leader node is a last node of the majority of the plurality of storage nodes to store the new value.

6. The method of claim 1, wherein the intermediate state indicates that a value associated with a key stored by some of the plurality of storage nodes is in the process of being updated.

7. The method of claim 1, wherein a primary leader node is a first node of the plurality of storage nodes to which the intent indicator is written.

8. The method of claim 1, wherein determining a latest value instance of the key among a majority of the plurality of storage nodes is determined based on corresponding sequence numbers associated with the key stored among the majority of the plurality of storage nodes.

9. The method of claim 1, wherein the latest value instance is the intent indicator.

10. The method of claim 1, wherein the latest value instance is the new value.

11. The method of claim 1, wherein the new value has a corresponding epoch leader instance number.

12. The method of claim 11, wherein the corresponding epoch leader instance number is used by a primary node of the plurality of storage nodes to update one or more data entities stored across the plurality of storage nodes.

13. The method of claim 1, further comprising:
    comparing a current epoch leader instance number of a primary leader node of the plurality of storage nodes with a previous epoch leader instance number of the primary leader node of the plurality of storage nodes; and
    determining the primary leader node of the plurality storage of nodes is caught up based on the comparison.

14. The method of claim 13, wherein the primary leader node of the plurality of storage nodes is determined to be caught up in the event the current epoch leader instance number of the primary leader node is a next epoch leader instance number.

15. The method of claim 1, wherein a primary leader node of the plurality of storage nodes is configured to receive the request to store the new value to the key and to receive the request to read the stored value of the key.

16. A system, comprising:
    a processor configured to:
    receive a request to store a new value to a key to be fault tolerant across a plurality of storage nodes of a storage system;
    in response to the received request to store the new value to the key:
    write an intent indicator to the key in at least one less than a majority of the plurality of storage nodes, wherein the intent indicator has a corresponding sequence number wherein the corresponding sequence number of the intent indicator is greater than a sequence number of a stored value of the key, wherein the intent indicator indicates that the key is an intermediate state; and
    store, as a next value instance of the key, the new value of the key in some of the storage nodes, wherein the new value of the key has a corresponding sequence number, wherein the corresponding sequence number of the new value of the key is greater than the corresponding sequence number of the intent indicator;
    receive a request to read a stored value of the key;
    determine a latest value instance of the key among a majority of the plurality of the storage nodes based on a sequence number of the key; and
    return the determined latest value instance of the key; and
    a memory coupled to the processor and configured to provide the processor with instructions.

17. The system of claim 16, wherein the processor is further configured to store the new value to the majority of the plurality of storage nodes.

18. A computer program product, the computer program product being embodied in a non-transitory computer readable storage medium and comprising computer instructions for:
    receiving a request to store a new value to a key to be fault tolerant across a plurality of storage nodes of a storage system;
    in response to the received request to store the new value to the key:
    writing an intent indicator to the key in at least one less than a majority of the plurality of storage nodes, wherein the intent indicator has a corresponding sequence number, wherein the corresponding sequence number of the intent indicator is greater than a sequence number of a stored value of the key, wherein the intent indicator indicates that the key is an intermediate state; and storing, as a next value instance of the key, the new value of the key in some of the storage nodes, wherein the new value of the key has a corresponding sequence number, wherein the corresponding sequence number of the new value of the key is greater than the corresponding sequence number of the intent indicator;

receiving a request to read a stored value of the key;

determining a latest value instance of the key among a majority of the plurality of the storage nodes based on a sequence number of the key; and returning the determined latest value instance of the key.

19. The method of claim 1, wherein at least one of the storage nodes is offline, the method further comprising determining the latest value instance of the key among the majority of the plurality of the storage nodes is the intent indicator.

20. The method of claim 19, wherein the determined latest value of the key that is returned is a previous value of the key.

* * * * *